(12) United States Patent
Weihe

(10) Patent No.: US 9,244,337 B2
(45) Date of Patent: Jan. 26, 2016

(54) SPORTS CAMERA MOUNTING APPARATUS

(71) Applicant: Orion Jacob Weihe, Saratoga, CA (US)

(72) Inventor: Orion Jacob Weihe, Saratoga, CA (US)

(73) Assignee: ORION INNOVATIONS, LLC, Saratoga, CA (US)

( * ) Notice: Subject to any disclaimer, the term of this patent is extended or adjusted under 35 U.S.C. 154(b) by 0 days.

(21) Appl. No.: 14/074,695

(22) Filed: Nov. 7, 2013

(65) Prior Publication Data

US 2014/0140686 A1    May 22, 2014

Related U.S. Application Data

(60) Provisional application No. 61/723,785, filed on Nov. 8, 2012.

(51) Int. Cl.
*G03B 17/56* (2006.01)
*A45F 5/02* (2006.01)

(52) U.S. Cl.
CPC ............... *G03B 17/561* (2013.01); *A45F 5/02* (2013.01); *A45F 2200/0533* (2013.01)

(58) Field of Classification Search
USPC ........................................ 396/428, 423, 544
See application file for complete search history.

(56) References Cited

U.S. PATENT DOCUMENTS

| | | | |
|---|---|---|---|
| 3,860,210 A * | 1/1975 | Berardinelli et al. | 248/308 |
| 4,298,149 A * | 11/1981 | Gottschalk et al. | 224/201 |
| 5,400,683 A * | 3/1995 | LaFlame | 84/421 |
| 7,576,800 B2 * | 8/2009 | Swain | 348/376 |
| 8,292,521 B2 * | 10/2012 | Chamberlayne | 396/423 |
| 8,622,264 B2 * | 1/2014 | Messner | 224/251 |
| 2006/0186151 A1 * | 8/2006 | May | 224/265 |
| 2008/0173785 A1 * | 7/2008 | Hagler et al. | 248/690 |
| 2013/0101277 A1 * | 4/2013 | Barreiro | 396/55 |
| 2013/0105662 A1 * | 5/2013 | Cote | 248/689 |

* cited by examiner

*Primary Examiner* — W B Perkey
*Assistant Examiner* — Linda B Smith

(57) ABSTRACT

An apparatus for an attachable mount having a center plate with a mount for a camera is described. A first arm is coupled to a first end of the center plate and a second arm is coupled to a second end of the center plate. There is a catch coupled to an end of the first arm and a catch coupled to an end of the second arm. At least one of the catches is adjustable in distance from the center plate.

12 Claims, 16 Drawing Sheets

TOP VIEW

FRONT VIEW

SIDE VIEW

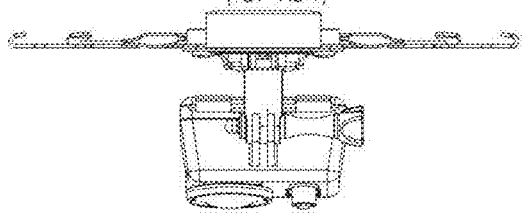
FIG. 6C
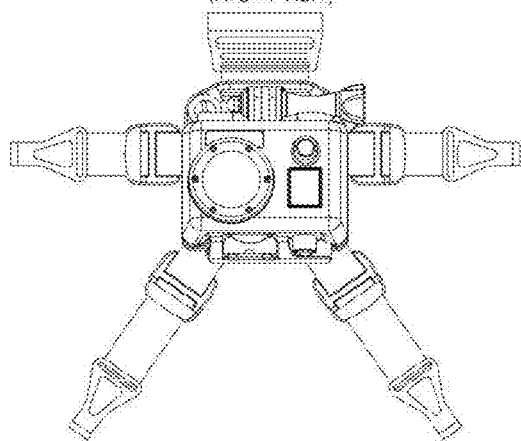 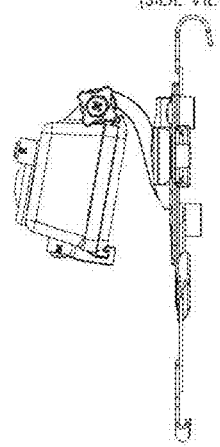
FIG. 6A  FIG. 6B

Section A-A View

Section A-A View

Section B-B View

Section B-B View

Section B-B View

Section B-B View

Section B-B View

FIG. 23
 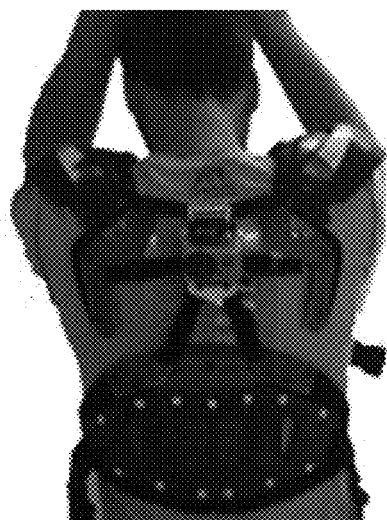
FIG. 24
FIG. 25

SPORTS CAMERA MOUNTING APPARATUS

CROSS-REFERENCES TO RELATED APPLICATIONS

This application claims priority to Provisional U.S. Application Ser. No. 61/723,785, entitled "SPORTS CAMERA MOUNTING APPARATUS," filed Nov. 8, 2012, which is owned by the inventor herein and expressly incorporated herein by reference.

BACKGROUND OF THE INVENTION

Capturing high quality Point Of View (POV) camera footage of action sports can be done by mounting a sports camera onto a participant's body armor, such as a chest protector or roost deflector in the sport of motocross. In fact, the mounting of a POV camera high on the chest area of the user allows for a more realistic, first-person perspective and therefore higher value footage than mounting the camera, for instance, on the side or the top of the user's helmet. However, there are many challenges in creating an apparatus for properly mounting a camera onto a user's protective body armor for action sports.

For instance, due to the nature of many of these action sports, the camera and mount are subjected to high-intensity vibrations and occasional impacts. From these occurrences, if the mounting apparatus is not robust, dislodgement of the camera mount and, or camera from the body armor can result, causing the subsequent loss of or damage to the camera.

Besides having to be robust, it is advantageous for the mounting apparatus to be removable and easy to install. Many users do not want to permanently modify or add semi-permanent additions, such as pressure sensitive adhesive (PSA) tape mounted components, to their expensive personal equipment. This is more so for an apparatus that may not be used all the time. Also, a user might want the ability to mount the camera not only on the front of the body armor, but also the back of the body armor for a completely different camera angle and footage. Moreover, having a camera mounting apparatus that can be easily removed and re-installed without tools or consumables, allows for quick and easy transfer between users. This is of value for participants of activities such as off-road motorcycle trail riding.

Additionally, body armor, such as off-road motorcycle and ATV chest protectors, exists in many form-factors of great variation. This makes the task of convenient, secure, but temporary, universal mounting even more difficult.

What is needed is a camera mounting apparatus that addresses all of these challenges.

BRIEF SUMMARY

The camera mount provides convenient, secure, removable mounting of an image or video recording device to a user's sports body armor, such as a motorcycle or AN chest protector (body armor), or other suitable surface such as a motorcycle number plate or fender, by utilizing a center plate that is removably secured. The center plate accepts various camera mounting adapters via features on the center plate, or may directly attach to a camera without a mounting adaptor.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

Note: The routing of straps may not be shown in all figures, i.e. views may include strap representations w/out showing strap routing through slits or other coupling features or components.

Figure 1:
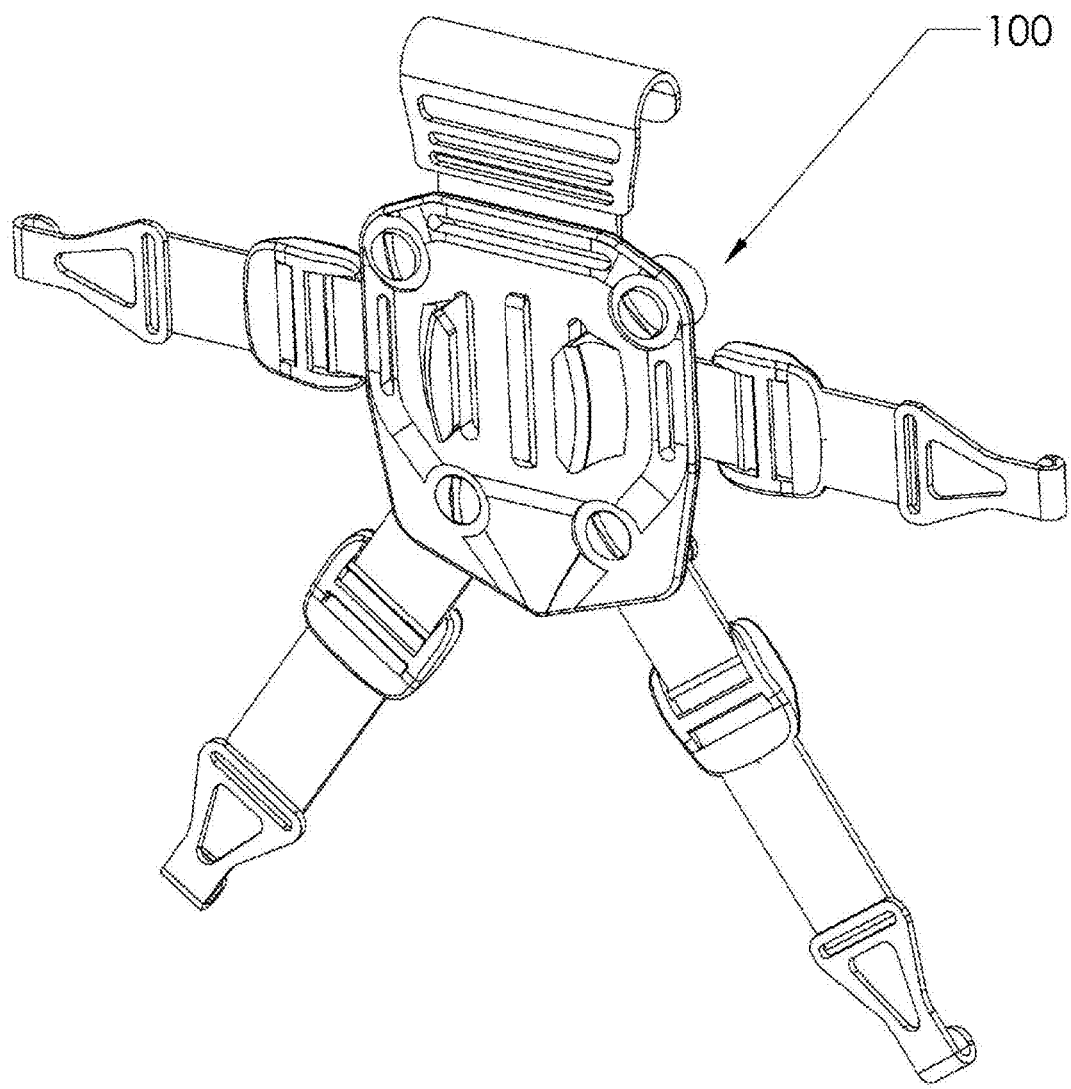

FIG. 1 is a perspective view of a camera mounting apparatus implementing one or more aspects of the disclosure.

Figure 2C:
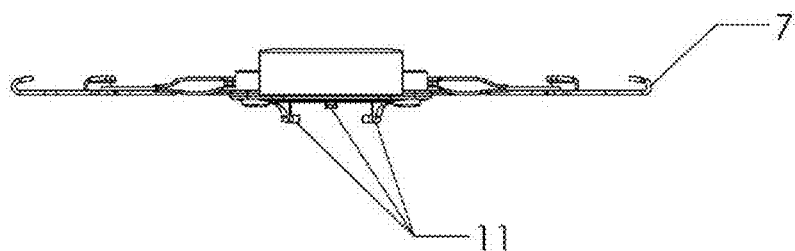
Figure 2A:
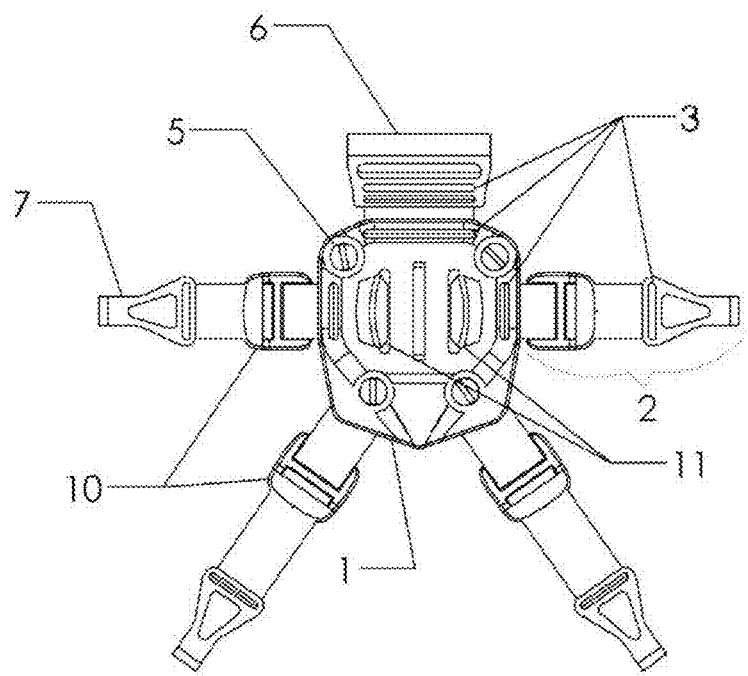

FIG. 2A is a front orthogonal view of a camera mounting apparatus implementing one or more aspects of the disclosure.

Figure 2B:
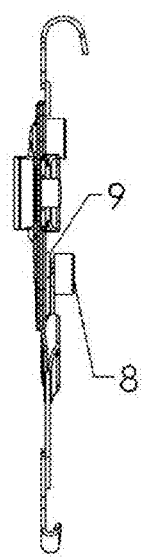

FIG. 2B is a side orthogonal view of a camera mounting apparatus implementing one or more aspects of the disclosure.

FIG. 2C is a top orthogonal view of a camera mounting apparatus implementing one or more aspects of the disclosure.

Figure 3:
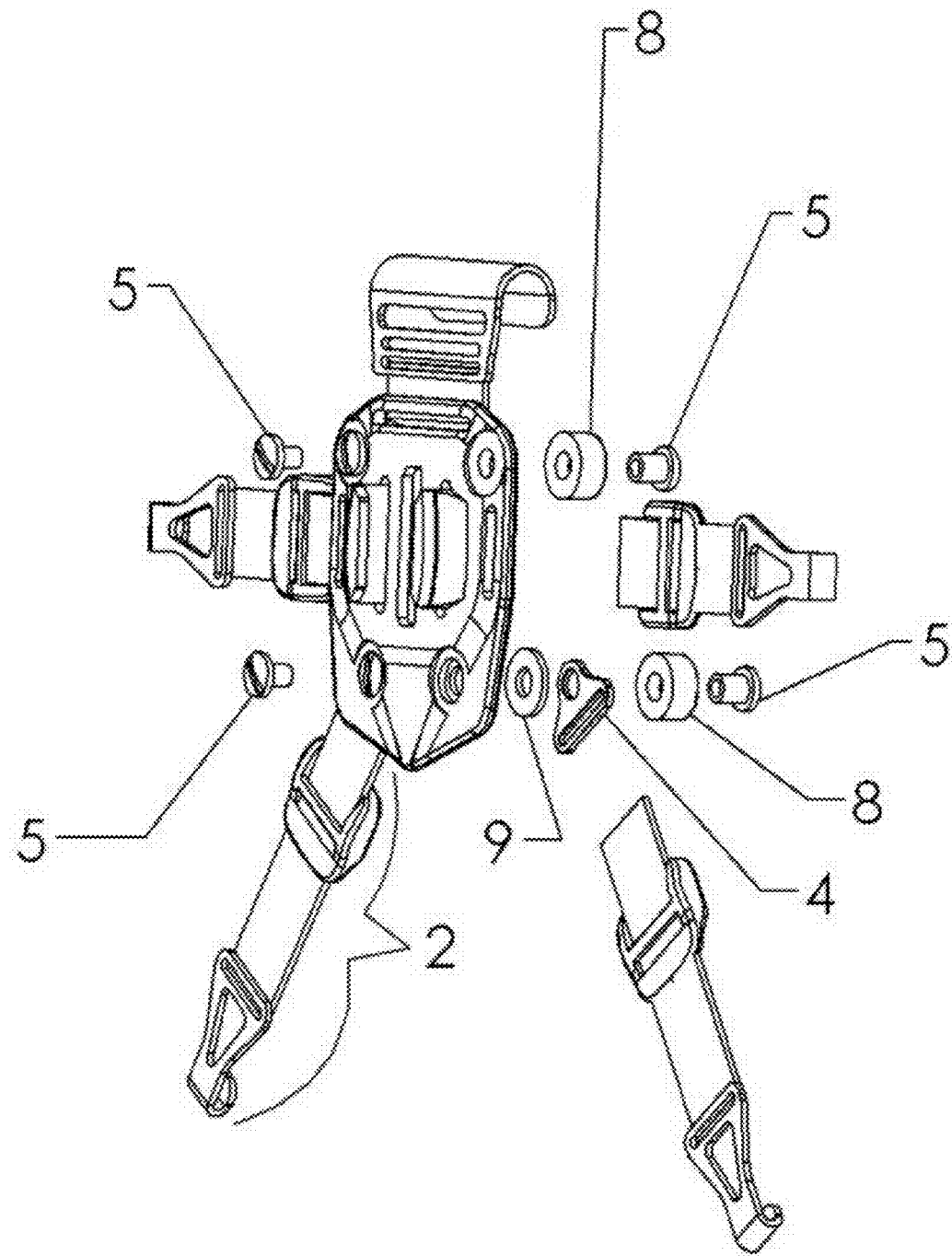

FIG. 3 is an exploded perspective view of a camera mounting apparatus implementing one or more aspects of the disclosure.

Figure 4A:
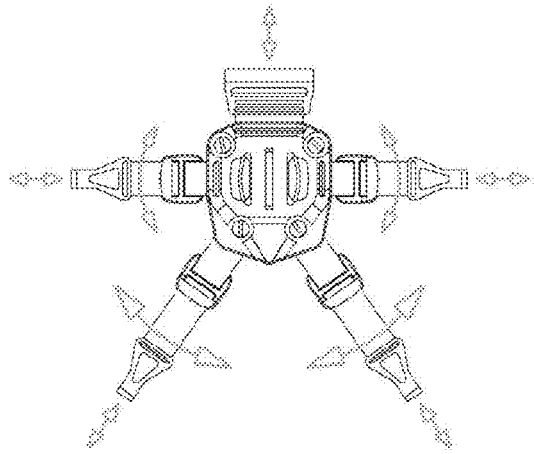

FIG. 4A is a front view of a camera mounting apparatus, implementing one or more aspects of the disclosure, which shows the strap articulation and adjustment of a 5 strap configuration.

Figure 4B:
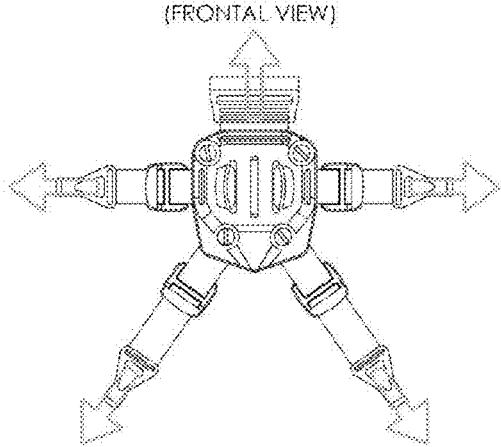

FIG. 4B is a front view of a camera mounting apparatus, implementing one or more aspects of the disclosure, which shows the stabilizing forces on the center plate of a 5-strap configuration.

Figure 5A:
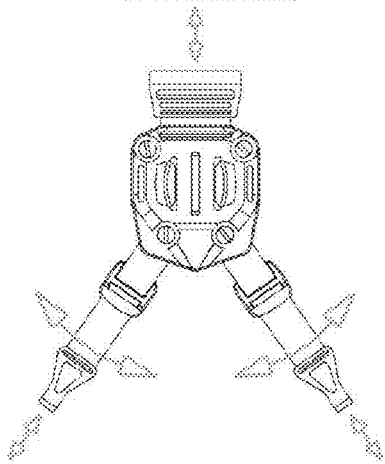

FIG. 5A is a front view of a camera mounting apparatus, implementing one or more aspects of the disclosure, which shows the strap articulation and adjustment of a 3 strap configuration.

Figure 5B:
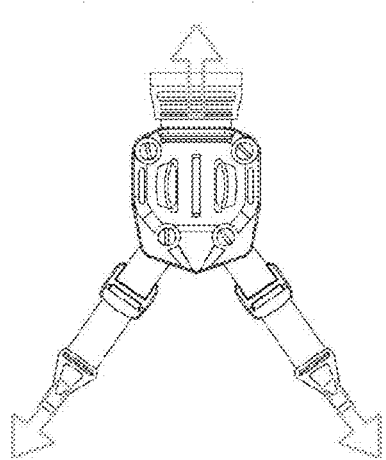

FIG. 5B is a front view of a camera mounting apparatus, implementing one or more aspects of the disclosure, which shows the stabilizing forces on the center plate of a 3-strap configuration.

FIG. 6A is a front orthogonal view of a camera mounting apparatus, implementing one or more aspects of the disclosure, with a POV camera and mounting adapter installed for a front-mounted usage.

FIG. 6B is a side orthogonal view of a camera mounting apparatus, implementing one or more aspects of the disclosure, with a POV camera and mounting adapter installed for a front-mounted usage.

FIG. 6C is a top orthogonal view of a camera mounting apparatus, implementing one or more aspects of the disclosure, with a POV camera and mounting adapter installed for a front-mounted usage.

Figure 7C:
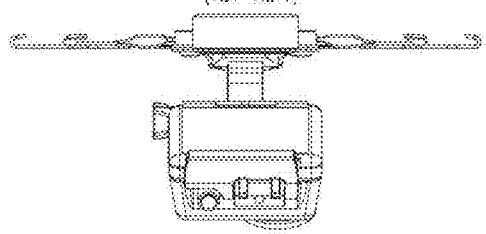
Figure 7A:
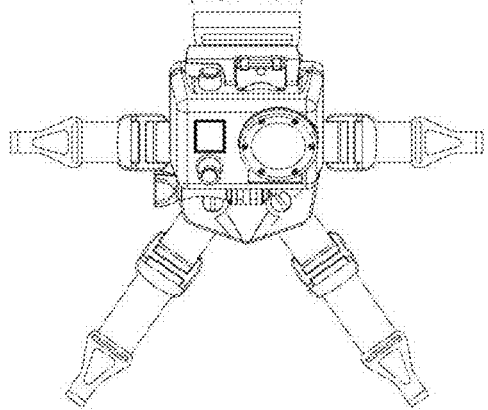
Figure 7B:
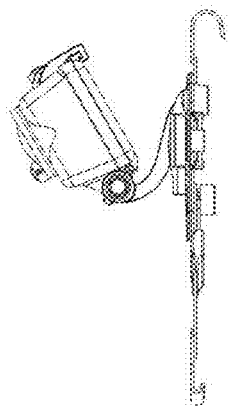

FIGS. 7A, 7B, & 7C are front, side, and top orthogonal views, respectively, of a camera mounting apparatus, implementing one or more aspects of the disclosure, with a POV camera and mounting adapter installed for a rear-mounted usage. The camera mounting adapter and camera are rotated 180 degrees from their positions shown in FIGS. 6A, 6B, and 6C and the camera is pivoted to compensate for the difference in angle of the body armor surface from the vertical.

Figure 8:
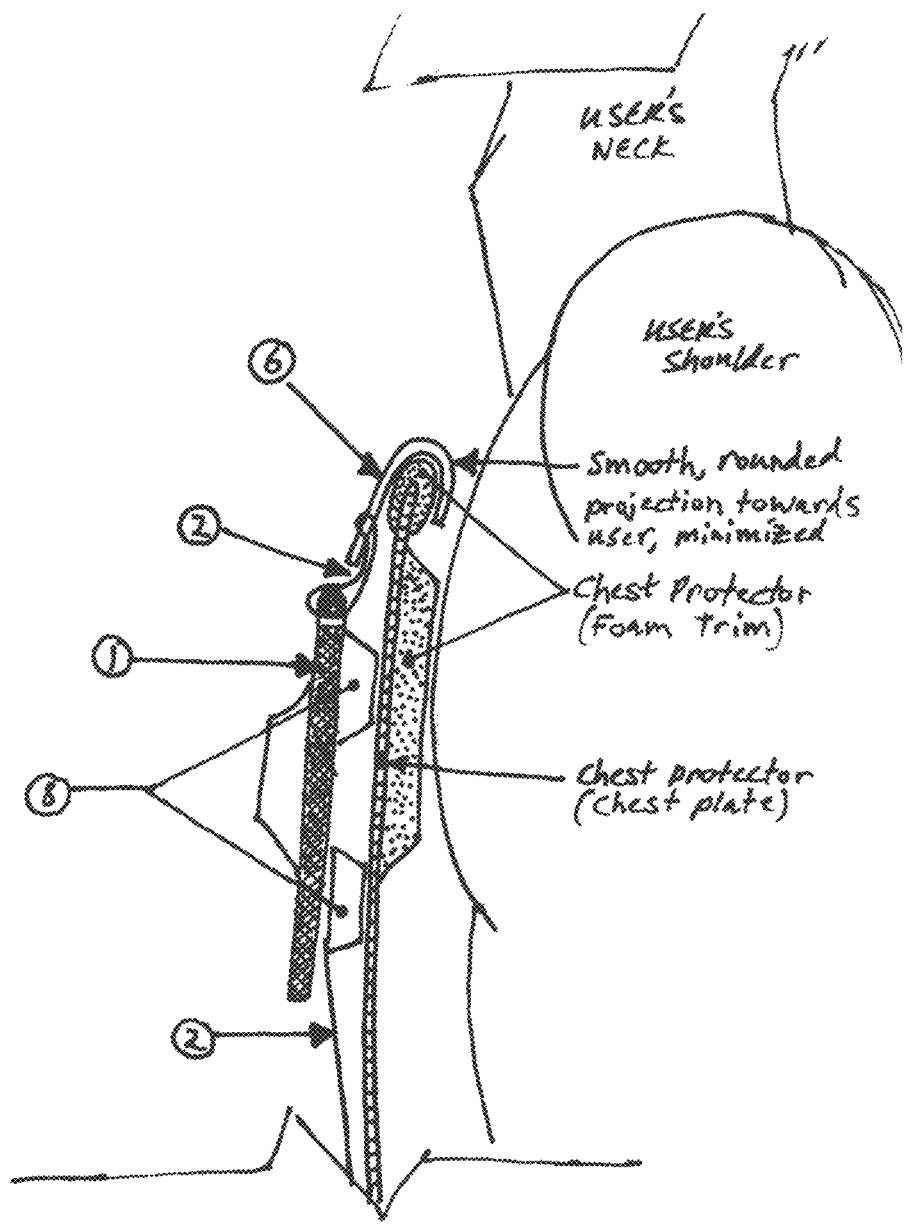

FIG. 8 shows a side view of one example of the superior hook engaging the neck relief of a chest protector.

Figure 9:
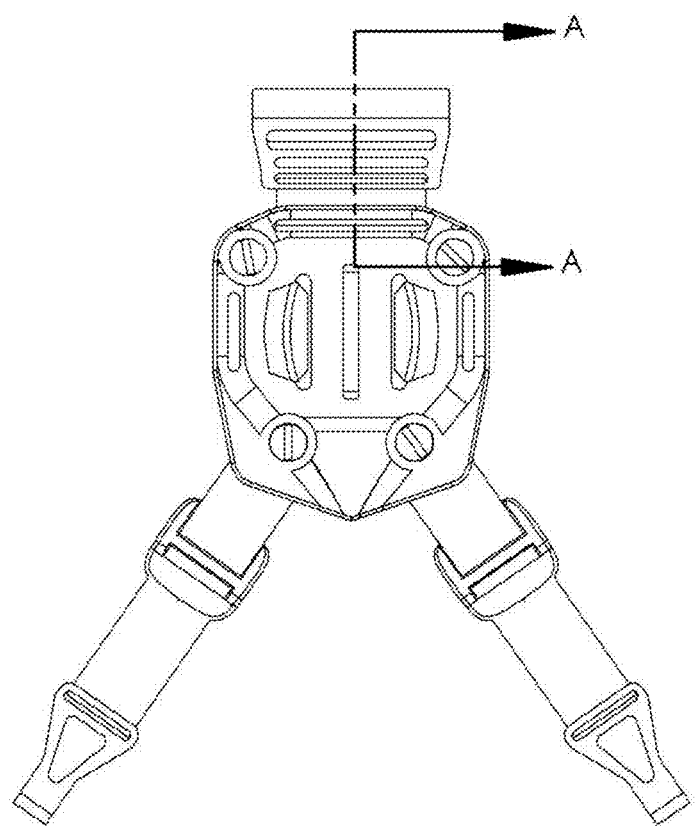

FIG. 9 shows the location of a partial section line A-A on a front view of a camera mounting apparatus implementing some aspects of the disclosure.

Figure 10:
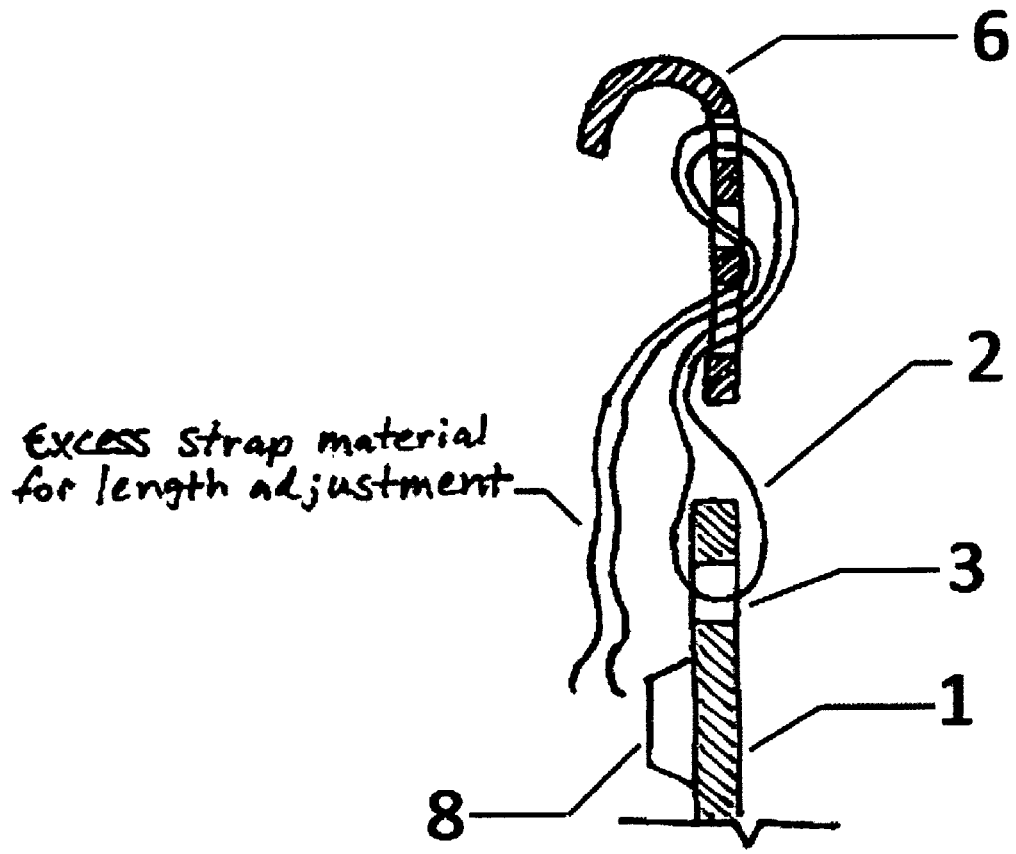
Figure 11:
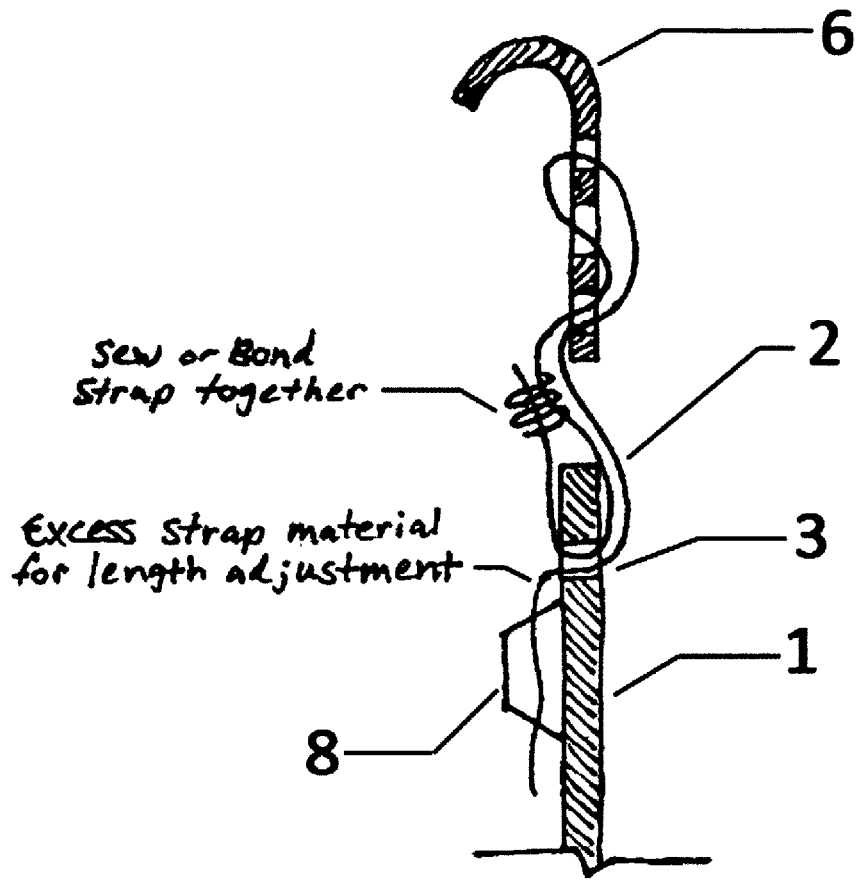

FIGS. 10 & 11 are partial cross-section views showing two different fastening strap routing methods using section line A-A from FIG. 9.

Figure 12:
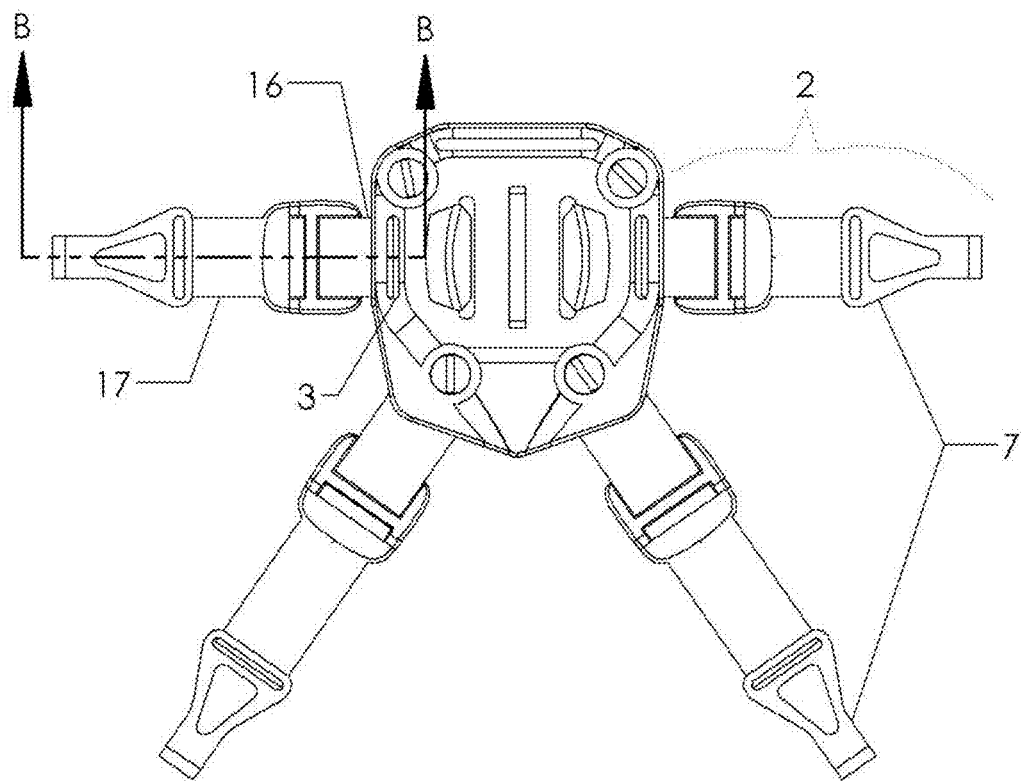

FIG. 12 shows the location of a partial section line B-B on a front view of a camera mounting apparatus implementing some aspects of the disclosure.

FIGS. 13 thru 17 are partial cross-section views of the center plate, horizontal side strap, buckle, and hook, showing various strap construction and coupling methods using section line B-B from FIG. 12.

Figure 18:
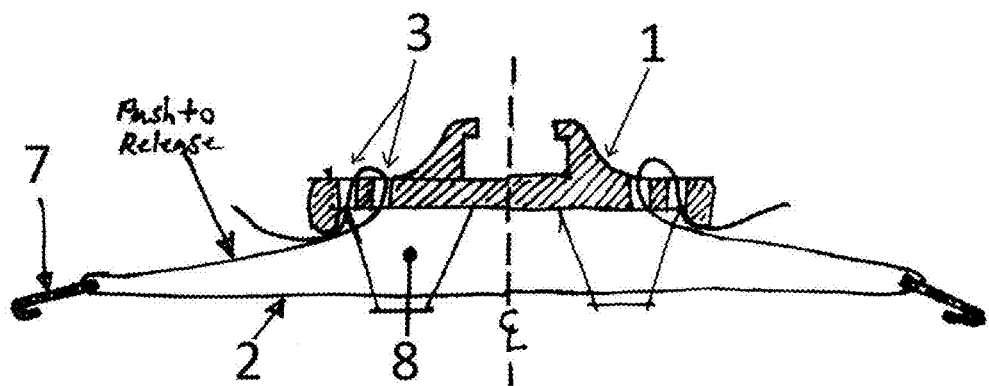
Figure 19:
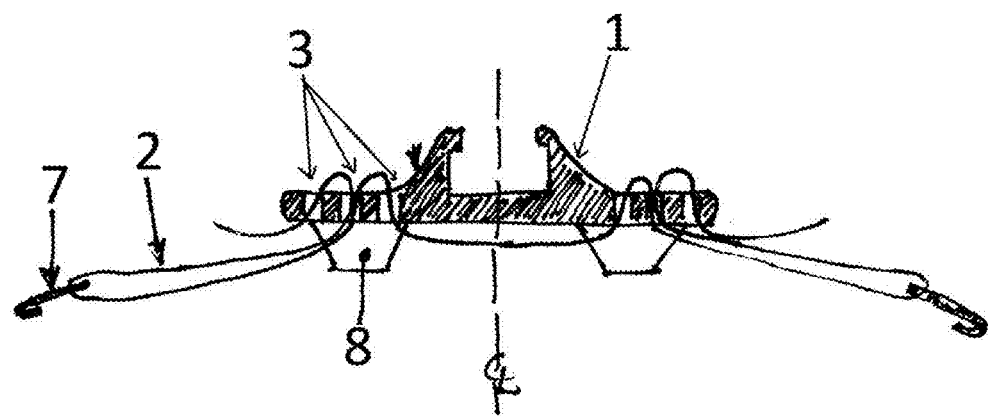

FIGS. 18 & 19 show cross-section views of the center plate, horizontal side strap, and left and right side straps and hooks. Each of these section views uses a section line, that is collinear with section line B-B shown in FIG. 12, but spans the full width of the apparatus. Each of these figures shows an example of an adjustable "buckle-less" strap design.

Figure 20:

FIG. 20 shows a front view of a working prototype of the apparatus installed on the front of a chest protector being worn by a person.

Figure 21:
Figure 22:

FIGS. 21-22 show perspective views of a working prototype of the apparatus installed on the front of a chest protector being worn by a person.

FIG. 23 shows a front view of a working prototype of the apparatus installed on the front of a chest protector with a POV sports camera installed.

FIG. 24 shows a side view of a working prototype of the apparatus installed on the rear of a chest protector with a POV sports camera installed.

FIG. 25 shows a rear view of a working prototype of the apparatus installed on the rear of a chest protector with a POV sports camera installed.

REFERENCE NUMERALS IN THE DRAWINGS 1) center plate
2) strap (one embodiment of an arm)
3) slit feature
4) swivel mount
5) fastener, such as a binding post, rivet or screw+nut
6) superior hook (one embodiment of a catch)
7) inferior hook (one embodiment of a catch)
8) bumper
9) spacer, or washer
10) strap buckle
11) camera mounting feature(s)
12) bar/clip
13) spring clip
14) hook feature for buckle
15) sewn-end loop
16) buckle-side strap
17) hook-side strap
100) attachable mount

DETAILED DESCRIPTION OF THE INVENTION

Various embodiments of the invention are described hereinafter with reference to the accompanying drawings, in which some, but not all embodiments of the invention are shown in the figures. This invention maybe embodied in many different forms and should not be construed as limited to the embodiments set forth herein; rather, these embodiments are provided so that this disclosure will satisfy applicable legal requirements.

In one embodiment, a center plate of the apparatus is constrained by a superior hook and two or more inferior hooks. The superior hook engages, for instance, the long padded edge at the front (or back) of the head opening, or neck relief, on a dirt bike chest protector in a downward direction, while the two or more inferior hooks engage features such as vents or chest plate edges located inferiorly to the superior hook and its engagement point. The inferior hooks apply forces counter to that of the superior hook, in addition to applying lateral stabilizing forces if possible. This embodiment could utilize a low-profile, flat hook, narrow headed geometry for the inferior hooks allowing the engagement of many types of features found on chest protectors and roost deflectors from many different manufacturers. This would allow for broad compatibility. The hooks can be coupled to the center plate via straps. These straps can be composed of, for instance, woven nylon webbing, or tape. Adjustable strapping components, such as a TENSIONLOCK style buckle, cam buckle, or other type of buckle allows for the tensioning of the hooks against the body armor features. The straps can be attached to the center plate by using, for instance, slit features in the plate or swivel mounts fastened to the plate, through which the straps are routed. Swivel mounting allows, for instance, two straps, located inferiorly to the superior hook, a degree of freedom advantageous for use with a multitude of products, as engagement features and their position on products vary. If a single wide upper hook is used, and it does not employ a swivel mount as the means to couple to the center plate, a degree of freedom is eliminated. This can help make installation easier and provide a more secure means of mounting; the centerline of the center plate would be more easily aligned with the center line of the chest plate (or rear plate) of the chest protector. The superior hook could be coupled to the center plate by use of a strap and one or more slit features in each component. This would allow for articulation of the hook and strap length adjustment, both of which could aid in body armor product compatibility. Bumpers, or resilient features, on the backside (posterior side) of the center plate would provide some vibration isolation between the center plate and body armor surface it rests upon, while providing spring force against the straps and the center plate for secure mounting. To simplify the apparatus and provide a more compact design, one fastener can be used to couple both a bumper and a strap to the center plate.

By fixing a elastomeric-cushioned plate to a user's body armor with multiple articulating straps and removable hooks of specialized geometry, the apparatus is different from and better than anything that exists in its field because it allows for both temporary and secure sports camera mounting to body armor, such as a dirt bike chest protector, as well as other suitable surfaces such as a number plate on a motorcycle.

Being easy to install and remove, users can mount the apparatus to the front or the back of their body armor to capture camera footage from various angles, in addition to transferring the apparatus and camera to another user's body armor, quickly and easily without tools or consumable materials, such as pressure sensitive adhesive (PSA) mounted elements.

The adjustability and design of the apparatus also allows for the user to position the camera as needed on the front (or rear) of the chest protector allowing for video capture. If the camera is positioned too low, the view could be compromised by, for instance, the handlebars of the motorcycle or AN; too high and the camera could limit user's head movement, i.e.

when the user tilts his or her head down and forward. Therefore the adjustable nature of the apparatus allows the user to fine tune it to suit their particular needs, as dictated by their body size and proportions, equipment, and usage.

The fastening strap and hook arrangement provide secure mounting on a variety of motorcycle chest protectors, reducing the possibility of losing the camera during the activity, while having broad market appeal.

The problem with the other POV camera mounting apparatuses is that they are not inherently designed for this application and lack features that allow for convenient and secure, temporary mounting on a user's chest protector. They either simply do not allow for attachment to the user's body armor or rely on PSA tape and, or hook and loop material.

By utilizing adjustable straps, hooks of specific geometries, and a centrally located mounting plate, this apparatus provides more secure mechanical mounting while allowing for more a convenient installation, removal, and a greater degree of adjustability. This apparatus reduces the likely hood of camera loss or damage from dislodgement. Being removable, the mounting apparatus also provides greater versatility in usage—for both a single user (multi-position) and multiple users (via the transfer between users).

The design of the apparatus, with its articulating straps, hooks of specific geometries, and adjustability also allows for broad compatibility with the market's multitude of chest protectors and roost deflectors.

FIG. 1 shows a perspective view of one embodiment of an attachable mount 100 for a camera (camera not illustrated). The individual components of this embodiment are called out in FIGS. 2 & 3. As can be seen in FIGS. 2 & 3, the center plate 1 is attached to arms, for example straps 2, for instance, by slit features 3 in the center plate through which the arms are routed or by swivel mounts 4 secured to the center plate 1 with fasteners 5. Each arm 2 is coupled to a catch 6 or 7, on its distal end (end furthest from the center plate 1). This can be done for instance, by threading the strap thru one or more slit features 3 in hook. In this embodiment superior hook 6 is a low-profile flat, wide hook with an overall hook feature width of 20-100 mm. In this embodiment inferior hook 7 is a low-profile flat, narrow tipped hook, with a tip width of 1-20 mm. Multiple slit features 3 on a superior hook 6 or on the center plate 1 can be used to provide strap length adjustment with a single piece of strap material, while minimizing sewing. FIGS. 8 through 19 help describe some of embodiments of these adjustable straps; these figures will be discussed further later in this detailed description. The center plate 1 can use two or more bumpers 8 which are each fixed to its back, or posterior, side (side closest to the body armor, or other mounted surface) via a fastener 5. A fastener 5 can also fix both a bumper 8 and a swivel mount 4 with its respective arm, or strap. A spacer 9 is positioned on the fastener 5 where a swivel mount 4 is utilized, to provide clearance between the arm 2 and the center plate 1, while reducing axial movement of the fastener 5 and bumper 8. Buckles 10 can be used to adjust the length of the straps, which can consist of one or more pieces of strap material, i.e. each strap does not have to be one continuous piece of material; one or more pieces of strap material can be connected by a buckle 10 to form a singular strap 2. A buckle 10 can consist of for instance a TENSIONLOCK style buckle or a cam buckle. The center plate 1 has camera mounting features 11 that interface to commercially available camera mounting components, such as a GOPRO HERO quick disconnect mount, which are illustrated in FIG. 2C. Alternatively, the center plate 1 can interface a custom or yet-to-be designed mounting component or components. The camera mounting feature 11 can either be integrated into the center plate or it can be a separate component that is fixed to it, allowing for interchangeability and fitment of different cameras or systems. The camera mounting feature 11 can also be as simple as a flat surface on which a PSA camera mount, or adapter, can adhere to. On some body armor, a flat surface is not available for adhering to and thus mounting by PSA; a flat surface on the center plate 1 would provide a mounting area in this case.

While the center plate 1 allows for a rigid interface by which a camera or camera mount can be attached, the arms 2 which extend from the center plate 1 in different directions constrain the center plate 1 on the chest protector or other mounted surface by applying counter stabilizing forces on the center plate 1. The flexible material of the arms 2 contours the surfaces of different chest protectors yet allows firm tensioning against the superior hook 6 and inferior hooks 7 which engage features on the body armor or mounted plate. The low profile, narrow head of the inferior hook 7 allows it to fit into small vents and features of various chest protectors. The profile of the inferior hook 7 can be seen in the top view shown in FIG. 2C.

In another embodiment and not illustrated in FIG. 1, the attachable mount for a camera may have only two arms (or straps), opposite to one another. The two arms may be flexible, semi-flexible, rigid, or be made from a combination of flexible and rigid elements. The arms may have elastic elements to provide an inwardly contracting force to secure the mount, or may have adjustable, straps capable of being tightened. The arms may include catches for securing the mount, for example hooks, fasteners, buckles, clips, or snaps. The catches may be adjustable in distance from the center plate.

In another embodiment, two arms are positioned on a first half of the center plate, adjacent to one another (and illustrated in FIG. 5B) and opposite a catch for attaching the mount.

FIGS. 4 & 5 show the stabilizing forces, represented by straight arrows, imposed on the center plate 1 by the catches 6 & 7 for both a 5-strap and 3-strap configuration. The inferior hooks 7 and their respective straps provide downward force on the center plate 1, counter to the force of the superior hook 6, in addition to lateral stabilizing forces if they engage features far enough away from the centerline of the chest protector. Stable mounting can be done with two arms (for example, straps), with three arm and hook assemblies, with four arms (for example with two arms in an upper half of the center plate and two arms in a lower half of the center plate), with five arms, with straps forming an upside-down "Y" pattern, and with more straps or arms. The number of straps for stable mounting, however, could be dependent upon the chest protector it is used with as engagement features vary in size and location. Additional arms 2 and catches 7 could extend approximately horizontally from the sides of the center plate 1 to provide more lateral stabilizing forces. This is represented by the 5-strap configuration, as illustrated in FIGS. 4A and 4B. These horizontal side arms could be removable if not needed.

The superior hook 6 is specially designed to carry and distribute a downward force on the, typically foam, trim that lines the neck relief or head opening in the body armor (as illustrated in FIG. 8). FIG. 8 shows the engagement of the superior hook 6 to neck relief. Under normal usage, the superior hook 6 would be the uppermost hook, but not necessarily, depending on the mounting application. The profile of the hook feature can be tapered to allow the user to slide the hook onto trims of various sizes, compressing the material for a secure fit. The relatively thin material (~0.5-3 mm) of the hook allows for usage with a neck brace or neck support with minimal or no interference. When used in conjunction with a chest protector, many times neck braces are fit inside of the chest protector head opening, so having a low profile hook that engage the neck opening is important to maximize clearance.

FIG. 8 also shows the superior hook 6 in a position on the neck relief of a chest protector. This is dictated by its profile and the routing of the strap thru the hook's slits; a downward pull on the strap twists the hook's bottom edge away from the user, thus minimizing or eliminating any protrusion towards the user. Reducing the hook's projection toward the user and increasing the potential contact area, reduces the impact pressure cause by the superior hook 6. For example, if the user were to impact an object in the area of the superior hook 6 (which would be in the upper chest/lower neck area in the case of it being front mounted) and the superior hook 6 created a hard, protruding feature, the user could possibly be injured or sustain greater injury than would have otherwise been sustained. The superior hook 6 can be coupled with the center plate via the slit features 3 in the hook and a strap 2 so that its position reduces this projection towards the user. Two embodiments of this are shown in FIGS. 10, & 11.

FIGS. 10 & 11 show examples of strap routing between the center plate 1 and the superior hook 6 that provide for the length adjustment of the strap 2, advantageous positioning of the superior hook 6 by forces applied through the tensioning of the strap 2, and reduction of the minimum distance between the center plate 1 and superior hook 6. Both routing configurations require minimal or no sewing for assembly. In both cases, the excess strap material can be hidden in the space between center plate and the surface of the body armor, in between the bumpers. This has aesthetic advantages, while reducing the likelihood of the strap flapping by the air moving pass the apparatus.

Alternatively, the superior hook 6 can be rigidly or semi-rigidly coupled the center plate 1 to achieve this, while further reducing both the number of components and cost. Rigidly coupling the superior hook 6 to the center plate 1 can also be done in a way that it is adjustable, by using features such as slots and, or patterned mounting holes with one or more fasteners (not illustrated).

In another embodiment, a hook can be part of a unified piece including a center plate (not illustrated). For example, a plastic injection molding process can form a center plate with an integral hook during the same injection process. In this embodiment, the hook is not removable from the center plate without damage to either the hook or the center plate and is not adjustable in distance from the center plate Buckles 10 for the horizontal straps 2 can be coupled directly to the center plate 1 with for instance metal clips or by snapping them into features integrated into the center plate 1 to reduce overall width thus increasing adjustment range. Alternatively, the buckles 10 can be coupled with strap material, utilizing one or more slit features 3 per strap in the center plate 1. FIGS. 12 through 19 show various embodiments of these adjustable buckle-to-center plate interfaces.

FIG. 12 shows one embodiment of an attachable mount with four arms, without a superior hook. Each of the two side arms 2 is shown coupling the center plate 1 through the use of a slot feature 1. Alternatively, the two side arms 2 can be swivel mounted to the center plate 1. FIG. 12 also shows a partial section line B-B through the centerline through one of the side arms 2.

Figure 13:
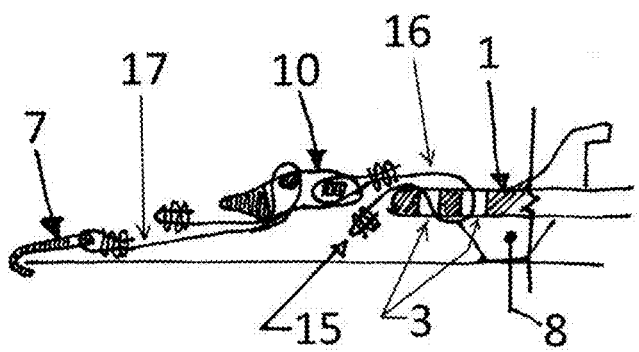

FIG. 13 shows one possible embodiment of the connection between the center plate 1 and the side arm 2 by using a buckle-side strap 16, which is attached to the buckle 10, that is routed through two slit features 3 in the side of the center plate 1. As the end of hook-side strap 17, which is connected to an inferior hook 7 (assumed to be fixed in this case), is pulled (and tightened) through the buckle 10, the buckle-side strap 16 cinches down on itself. A sewn-end loop 15 in the buckle-side strap 16 helps prevent its end from pulling through the slit features 3. This configuration provides constraint and articulation of the buckle 10, and reduction of the distance between the buckle 10 and plate 1. This routing also provides for the removal of the side arm as a whole from the apparatus when not needed, while reducing the need for sewing.

Figure 14:
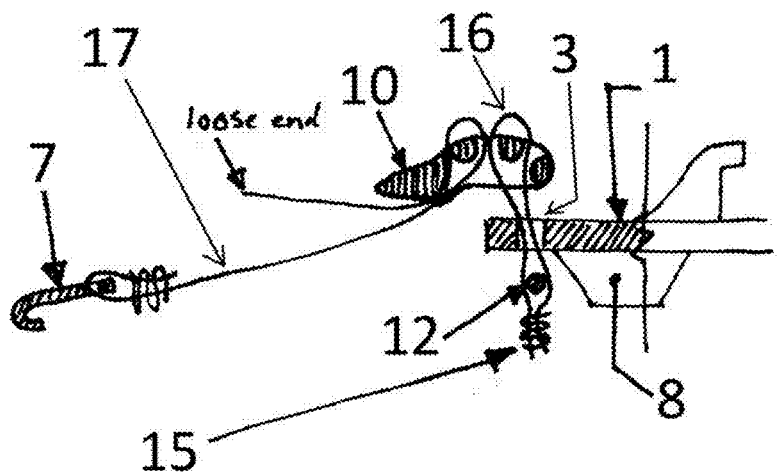

FIG. 14 shows one possible embodiment of the connection between the center plate 1 and the buckle 10 (and hence the side arm). This embodiment utilizes a buckle-side strap 16 with a sewn-end loop 15 that is passed through a slot feature 3 in the center plate 1. A removable bar/clip 12 is inserted into the sewn-end loop 15 so that the sewn-end loop 15 cannot be pulled back out through the slot feature 3, thus constraining buckle 10 to which it is attached and the side arm as a whole to the center plate. The bar/clip 12 can have two hooked ends which keep it from unintentionally sliding out of the sewn-end loop 15. When the bar/clip 12 is removed, the sewn-end loop 15 can be pulled back out through the slit feature 3 in center plate 1, allowing the removal of the buckle-side strap 16 (and the side arm 2 as a whole) from the center plate 1. This embodiment minimizes the distance between the buckle 10 and center plate 1, and hence the minimum engageable width of the side inferior hooks, which can be advantageous in terms of mounting compatibility. This routing also provides for the removal of the side arm as a whole from the apparatus when not needed, while reducing the need for sewing.

Figure 15:
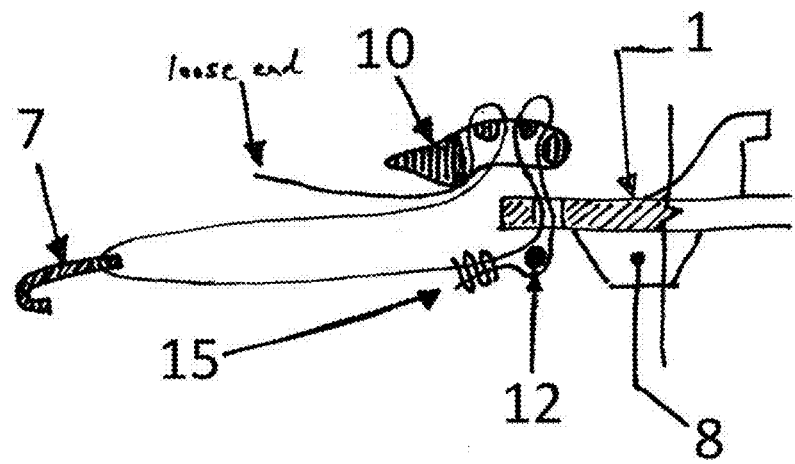

FIG. 15 shows one possible routing of the strap to constrain the buckle 10 when tensioning the loose end of the strap 2, while reducing the distance between the buckle 10 and center plate 1. The routing also allows both the necessary strap buckle articulation for proper function and the removal of both the side strap 2 and the hook 7 from the apparatus when not needed. This strap routing utilizes a removable bar/clip 12 that is inserted into a sewn-end loop 15 of the strap 2, thus constraining the buckle to the plate. The bar/clip 12 can have two hooks features, one at each of its ends which keep it hooked into the loop. When inserted, it prevents the strap loop from passing up thru the slot in the plate. When the bar/clip 12 is removed, the sewn-end loop 15 can be pulled thru the slit feature 3 in center plate 1, allowing the removal of the strap 2 from the center plate 1.

Figure 16:
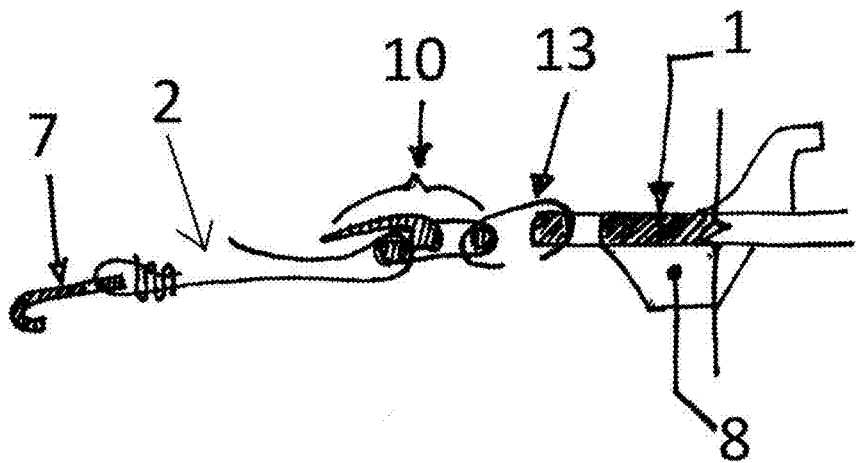

FIG. 16 shows one possible connection design between the center plate 1 and the buckle 10 or more specifically as shown a cam buckle. The buckle 10 is coupled to the center plate 1 via a spring clip 13. This configuration allows for the constraint, articulation of the buckle 10, and reduction of the distance between the buckle 10 and center plate 1. This routing also allows the removal of both the side strap 2 and the hook 7 from the center plate 1 when not needed, while reducing the need for sewing.

Figure 17:
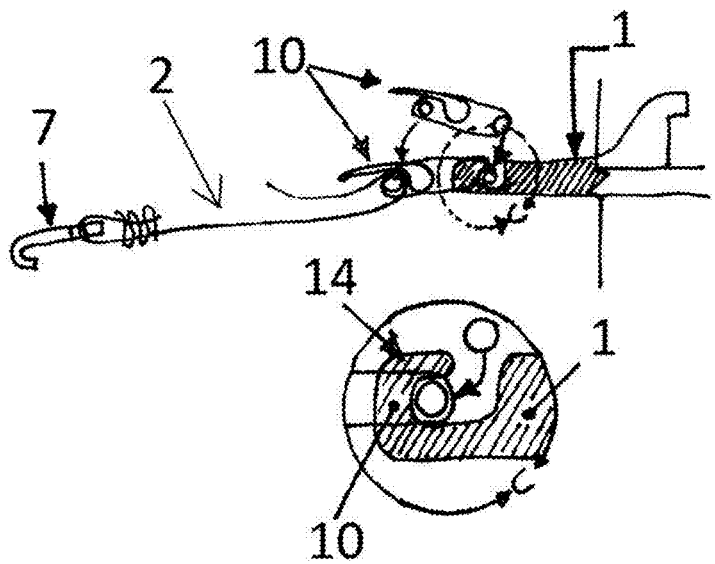

With a section and detail view, FIG. 17 shows one possible connection design between the center plate 1 and the buckle 10 or more specifically as shown a cam buckle. The buckle is snapped into a hook feature 14 in the center plate 1. Both the section view and the detail view of the section view show the bar feature of the buckle being snapped into the hook feature 14. This configuration allows for the necessary constraint and articulation of the buckle 10, and reduction of the distance between the buckle 10 and center plate 1. This routing also allows the removal of both the side strap 2 and the hook 7 from the center plate 1 when not needed, while reducing the need for sewing.

The FIGS. 18 & 19 each show a design that provides a single-piece arm between opposite sides of the attachable mount instead 100. This has advantages of reducing the need for extra hardware, reducing manufacturing or assembly complexity (for example sewing), providing a single adjustment point to tighten or loosen two sides simultaneously. In FIGS. 18 & 19, the horizontal side strap is routed thru two slits in the side of the center plate 1. The embodiment in FIG. 18 illustrates two slit features 3 per side in the center plate 1 while the embodiment in FIG. 19 illustrates three slit features 3 per side. In one embodiment, a continuous piece of strap material is utilized for both the left and right side inferior hooks 7. As the loose ends of the strap are pulled tight thru the slits in either side of the plate, the strap cinches down on itself, securing the hooks and the plate. This design allows for the removal of both the side straps 2 and the inferior hooks 7 from the center plate 1 when not needed, while reducing the need for sewing and the number of components.

The bumpers 8 provide cushion and additional spring force to the system. This additional spring force helps to provide continuous constraining forces thru the straps 2. Although it is said that the center plate 1 is rigid or semi-rigid, it can add some spring force to this tensioned strap system. This could be done if, for instance the center plate 1 was composed of a thermoplastic and it had some arch, or curvature that allows it to flex when the straps were tension. An arch might allow for extra clearance of chest plate surface features, allowing for more increased product compatibility. A spider-like body and multiple curved leg features (not illustrated) to where the elastomeric bumpers and, or fastening straps could attach, might give the reader a mental picture of an embodiment of this. Additionally, the straps 2 can also incorporate elastic elements for maintaining tension between elements, some of which can be non-rigid components, e.g. chest plates of thin polymer material or chest plates with are composed of multiple smaller rigid plates coupled together with flexible or semi-flexible elements.

Fabrication may be done using common manufacturing methods. The center plate 1 can be injection molding plastic, such as Polycarbonate or other rigid or semi-rigid material to reduce cost. The catches can be stamped or cut flat sheet metal that is then bent into their respective hooked profiles or they can be injection molded. The swivel mount 4 can also be stamped or cut sheet metal or plastic, or injection molded plastic. The bumpers 8 can be for instance compression molded or injection molded or fabricated by any other commonly used manufacturing technique for rubber or elastomeric products. The straps of woven material such as nylon, and can be cut with heat and sewn to their respective interfacing components or just routed thru their respective interfacing components, for the case where slit features are integrated in the component. To fix a bumper 8 to the center plate 1, a fastener 5 is simply pushed or screwed together through holes in the center plate 1 and the bumper 8. Alternatively, a bumper 8 can be molded into the center plate 1 or can be captured by features in the center plate 1 only (for push-in style bumpers). For the case of a swivel-mounted arm 2, a spacer 9, a swivel mount 4, and a bumper 8 can be stacked on the center plate 1 before pushing or screwing the fastener 5 together through the stacked components to attach the arm 2. The spacer 9, if needed, can be integrated into the center plate 1 to reduce manufacturing costs and ease of assembly. With the exceptions of the strap 2, bumper 8, and the bending of the sheet metal hooks 6 & 7, all parts can alternatively be machined, using conventional machining techniques.

Certain features of various embodiments this invention might not be necessary, but could add value. In one embodiment, five arms and catches (1 upper, 2 swivel-mounted lower, and 2 side) would provide more redundancy and security. User removable straps, hooks and fasteners can allow the changing out of components, such as hooks, or simply their removal if unnecessary for a particular application. Modular embodiments might also add value by offering the option for the permanent mounting to a chest protector using rivets and spacers as a small number of users might want a permanent installation. Fixed attachment to a motorcycle number plate may also be desirable by some users. Push-to-assemble fasteners such as binding posts are preferred for ease of assembly, but not required. Removable, push-to-connect fasteners such as binding posts with screw heads, would, depending on the strap construction, allow users to potentially configure their apparatus with specialized hooks or other components to fit specific applications without buying a new apparatus. This may not be necessary if the strap was constructed in such a way that the user could simply pull the loose end of the adjustment strap thru the buckle to remove and replace the hook. Bumpers that push into or thru holes can potentially be used if the swivel mount is separately fixed or not used on that area. Multiple swivel mounts could conceivably be fixed by a single fastener. Vertical adjustment of the position of the center plate 1 via its position relative to the superior hook 6 may be provided in one embodiment. The superior hook 6 could be replaced by, for instance, multiple separate hooks or multiple hook features on one component. Flexible mounting of the superior hook 6 is not necessary; it could be rigidly or semi-rigidly mounted to the center plate 1. For the side straps, hooks are optional and may be advantageous in some applications. For instance, in some applications, it might be beneficial to have the side straps wrap completely around the chest plate and back to one another where the ends are fastened together. In other embodiments, the catches may be buckles, clips, snaps, bars or fasteners, for example. Where a quick-disconnect camera mounting interface 11 (as depicted by two L-shaped hooks on the front side of the center plate in FIG. 2C) is used on the center plate 1, a relief, series of relief or a surface sloping away from the feature to provide more clearance between center plate 1 and the sliding mounting adapter might be beneficial. For example, if dirt and other debris are trapped in between the two sliding surfaces, scratching and binding might occur. Having one or more reliefs, such as linear grooves aligned with the direction of sliding, can reduce the scratching or the appearance of scratching and allow the user to clean the components better before removal.

In using one embodiment of the apparatus, the user locates the desired engagement features on his or her chest protector or roost deflector or other surface to be mounted. The arms are then adjusted to slightly longer than needed. After positioning the catches and arms to engage secure and appropriate features, the straps are cinched down. Once the apparatus is securely in place, the camera mount along with the camera would be installed using the camera mounting features on the center plate. In the case of a GOPRO HERO application, the user would simply snap the quick disconnect mount into the mounting features on the center plate. They would then check height position on the chest protector and camera angle before taking usable video or photos.

What is claimed:
1. A camera mounting apparatus comprising:
   a center plate with mounting provisions for positioning a camera on the anterior side of the center plate wherein the center plate can be composed of one or more conjoined elements;

a superior hook coupled to the superior end of the center plate; and a plurality of attachment straps directly connected to the center plate, with each of the attachment straps having a means of mechanical attachment to a mounted plate in order to constrain the center plate so that the posterior side of the center plate faces the mounted plate, at least two of the attachment straps attached to the inferior end of the center plate and called inferior straps, and configured to swivel at their respective attachment points to the center plate, the means of mechanical attachment being length adjustable from the center plate while maintaining an unchanged distance between the center plate and the mounted plate.

2. The apparatus according to claim 1, wherein the mechanical means of attachment to the mounted plate is a hook fastened to the distal end of each of the anterior straps.

3. The apparatus according to claim 1, wherein the superior hook is coupled to the center plate by a strap called the superior strap.

4. The apparatus according to claim 1 further comprising:
a plurality of inferior hooks, at least one inferior hook coupled to each one of the inferior straps, the inferior and superior hooks being removable.

5. The apparatus according to claim 1, the mounting provisions including a quick-release mount comprising:
a plurality of L-shaped hooks which project from the anterior side of the center plate.

6. The apparatus according to claim 1, wherein the mounting provisions comprise a hole through which a fastener can attach a camera, directly or indirectly.

7. The apparatus according to claim 1 wherein the superior hook is coupled to the center plate by at least one fastener and at least one corresponding slot feature or linear array of holes by which the superior hook position relative to the center plate is adjustable.

8. The apparatus according to claim 1 wherein the superior hook is integrated into the center plate.

9. The apparatus according to claim 1 wherein the mounted plate is human-wearable protective equipment.

10. The apparatus according to claim 3, the superior hook further comprising:
a plurality of slots, each of the plurality of slots running lengthwise and oriented perpendicular to the centerline of the center plate, the superior strap routed through the plurality of slots.

11. The apparatus according to claim 4 further comprising:
a bumper coupled to the posterior side of the center plate, the bumper being coupled to the center plate by a method selected from the group consisting of: fastening, molding, and bonding.

12. The apparatus according to claim 11, wherein the attachment straps are coupled to the center plate with a member selected from the group consisting of: a buckle, a clip, a snap, a bar, and a fastener.

* * * * *